(12) United States Patent
Dietrich, Jr. et al.

(10) Patent No.: US 7,009,605 B2
(45) Date of Patent: Mar. 7, 2006

(54) SYSTEM, METHOD AND COMPUTER PROGRAM PRODUCT FOR GENERATING A SHADER PROGRAM

(75) Inventors: Douglas Sim Dietrich, Jr., Los Gatos, CA (US); Ashutosh G. Rege, San Carlos, CA (US); Christopher T. Maughan, York (GB); Jerome F. Duluk, Jr., Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 293 days.

(21) Appl. No.: 10/102,989

(22) Filed: Mar. 20, 2002

(65) Prior Publication Data

US 2003/0179220 A1    Sep. 25, 2003

(51) Int. Cl.
*G06T 15/00* (2006.01)
(52) U.S. Cl. .................... 345/419; 345/726; 706/12
(58) Field of Classification Search ............... 345/419, 345/426, 427, 619; 706/12, 13, 46, 47
See application file for complete search history.

(56) References Cited

U.S. PATENT DOCUMENTS

| | | | | |
|---|---|---|---|---|
| 4,996,666 A | | 2/1991 | Duluk, Jr. et al. ............. 365/49 |
| 5,535,288 A | | 7/1996 | Chen et al. ................. 382/236 |
| 5,572,634 A | | 11/1996 | Duluk, Jr. .................... 395/119 |
| 5,574,835 A | | 11/1996 | Duluk, Jr. et al. ........... 395/121 |
| 5,596,686 A | | 1/1997 | Duluk, Jr. et al. .......... 395/122 |
| 5,669,010 A | | 9/1997 | Duluk, Jr. ............... 395/800.22 |
| 5,706,415 A | * | 1/1998 | Kelley et al. ................ 345/426 |
| 5,977,987 A | | 11/1999 | Duluk, Jr. .................... 345/441 |
| 5,995,113 A | * | 11/1999 | Mitchell et al. ............ 345/440 |
| 6,229,553 B1 | * | 5/2001 | Duluk et al. ................ 345/506 |
| 6,236,413 B1 | * | 5/2001 | Gossett et al. .............. 345/506 |
| 6,268,875 B1 | * | 7/2001 | Duluk et al. ................ 345/506 |
| 6,285,378 B1 | | 9/2001 | Duluk, Jr. .................... 345/441 |
| 6,288,730 B1 | | 9/2001 | Duluk, Jr. et al. .......... 345/552 |
| 6,345,244 B1 | * | 2/2002 | Clark ............................ 704/2 |
| 6,417,858 B1 | * | 7/2002 | Bosch et al. ................ 345/522 |
| 6,546,419 B1 | * | 4/2003 | Humpleman et al. ....... 709/223 |
| 6,570,578 B1 | * | 5/2003 | Smirnov et al. ............ 345/629 |
| 6,650,331 B1 | | 11/2003 | Lindholm et al. .......... 345/522 |
| 6,819,325 B1 | * | 11/2004 | Boyd et al. ................. 345/559 |
| 2002/0003541 A1 | | 1/2002 | Boyd et al. ................. 345/501 |

FOREIGN PATENT DOCUMENTS

| | | |
|---|---|---|
| WO | 93/23816 | 11/1993 |
| WO | 97/05575 | 2/1997 |
| WO | 97/05576 | 2/1997 |
| WO | 00/10372 | 3/2000 |
| WO | 00/11562 | 3/2000 |

(Continued)

OTHER PUBLICATIONS

Cluoard et al, Borg: A Knowledge-Based System for Automatic Generation of Image Processing Programs: IEEE Transactio on Pattern Analysis and machine Intelligence, vol. 21, No. 2, Feb. 1999, pp. 128-144.*

(Continued)

*Primary Examiner*—Phu K. Nguyen
(74) *Attorney, Agent, or Firm*—Zilka-Kotab, PC

(57) ABSTRACT

A method and computer program product are provided for generating a shader program. Initially, a file associated with a graphics effect is a selected. Such file is then read and processed. A shader program is subsequently generated based on the processing of the file to apply the graphics effect to an object.

46 Claims, 9 Drawing Sheets

| | FOREIGN PATENT DOCUMENTS | |
|---|---|---|
| WO | 00/11602 | 3/2000 |
| WO | 00/11603 | 3/2000 |
| WO | 00/11604 | 3/2000 |
| WO | 00/11605 | 3/2000 |
| WO | 00/11607 | 3/2000 |
| WO | 00/11613 | 3/2000 |
| WO | 00/11614 | 3/2000 |
| WO | 00/19377 | 4/2000 |

OTHER PUBLICATIONS

Kwanjai et al., Knowledge-Based Simulation To Assist in System Design Identification, Proceeding of Simulation, Dec. 1992, p 822-830.*

* cited by examiner

```
    • <imps>
       • <dx8>
          • <Shiny>
             <requirements>
                <bool name = "3_texture_support"
                   type = "function"
                   content = "GreaterEqual(D3DCAPS8/MaxSimultaneousTextures,
                   float( 3.0 ) ) />

< bool name = "api"
                   type = "function"
                   content = "GreaterEqual(
                   parameters/api/version, float( 5.0 ) ) />
             </requirements>
             <passes>
                <uint name = "PassCount"
                   type = "value"
                   content = "1" />
                <pass0>
                   <d3drenderstates>
                      <bool name = "D3DRS_ALPHABLENDENABLE"
                         type  = "value"
                         content = "false" />
                   <d3dtexturestagestates>
                      <stage0>
                         <D3DTEXTUREFILTERTYPE name = "D3DTSS_MINFILTER"
                            type = "value"
                            content = "D3DTEXF_LINEAR" />
                      </stage0>
                   </d3dtexturestagestates>

<pixelshader>
                      <string name = "shader"
                         type = "value"
                         content = "ps 1.1
                            tex t0
                            mad_sat r0, t0, v0, v1" />
                      <uint name = "handle"
                         type = "function"
                         content = "compile_dx8_ps( ../shader )" />
                      <constants>
                         <vector4 name = "c0" type = "value"
                            content = "0.0 1.0 0.2 –1.0" />
                         <vector4 name = "c1" type = "value"
                            content = "0.0 0.0 3.2 10.0" />
                      </constants>
                   </pixelshader>
```

SYSTEM, METHOD AND COMPUTER PROGRAM PRODUCT FOR GENERATING A SHADER PROGRAM

FIELD OF THE INVENTION

The present invention relates to computer graphics, and more particularly to shading operations within a graphics pipeline.

BACKGROUND OF THE INVENTION

Rendering and displaying 3-D graphics typically involves many calculations and computations. For example, to render a 3-D object, a set of coordinate points or vertices that define the object to be rendered must be formed. Vertices can be joined to form polygons that define the surface of the object to be rendered and displayed. Once the vertices that define an object are formed, the vertices must be transformed from an object or model frame of reference to a world frame of reference and finally to 2-D coordinates that can be displayed on a flat display device, such as a monitor. Along the way, vertices may be rotated, scaled, eliminated or clipped because they fall outside of a viewable area, lit by various lighting schemes and sources, colorized, and so forth. The processes involved in rendering and displaying a 3-D object can be computationally intensive and may involve a large number of vertices.

To create a 3-D computer graphical representation, the first step is to represent the objects to be depicted as mathematical models within the computer. 3-D models are made up of geometric points within a coordinate system consisting of an x, y and z axis; these axes correspond to width, height, and depth respectively. Objects are defined by a series of points, called vertices. The location of a point, or vertex, is defined by its x, y and z coordinates. When three or more of these points are connected, a polygon is formed. The simplest polygon is a triangle.

3-D shapes are created by connecting a number of 2-D polygons. Curved surfaces are represented by connecting many small polygons. The view of a 3-D shape composed of polygon outlines is called a wire frame view. In sum, the computer creates 3-D objects by connecting a number of 2-D polygons. Before the 3-D object is ultimately rendered on a 2-D display screen, however, the data of sophisticated graphics objects undergoes many different mathematical transformations that implicate considerably specialized equations and processing unique to 3-D representation.

For a long time now, 3-D rendering systems have been able to describe the "appearance" of objects according to parameters. These and later methods provide for the parameterization of the perceived color of an object based on the position and orientation of its surface and the light sources illuminating it. In so doing, the appearance of the object is calculated therefrom. Parameters further include values such as diffuse color, the specular reflection coefficient, the specular color, the reflectivity, and the transparency of the material of the object. Such parameters are globally referred to as the shading parameters of the object.

Early systems could only ascribe a single value to shading parameters and hence they remained constant and uniform across the entire surface of the object. Later systems allowed for the use of non-uniform parameters (transparency for instance) which might have different values over different parts of the object. Two prominent and distinct techniques have been used to describe the values taken by these non-uniform parameters on the various parts of the object's surface: procedural shading and texture mapping. Texture mapping is pixel based and resolution dependent.

Procedural shading describes the appearance of a material at any point of a 1-D, 2-D or 3-D space by defining a function (often called the procedural shader) in this space into shading parameter space. The object is "immersed" in the original 1-D, 2-D or 3-D space and the values of the shading parameters at a given point of the surface of the object are defined as a result of the procedural shading function at this point. For instance, procedural shaders that approximate appearance of wood, marble or other natural materials have been developed and can be found in the literature.

The rendering of graphics data in a computer system is a collection of resource intensive processes. The process of shading i.e., the process of performing complex techniques upon set(s) of specialized graphics data structures, used to determine values for certain primitives, such as color, etc. associated with the graphics data structures, exemplifies such a computation intensive and complex process. For each application developer to design these shading techniques for each program developed and/or to design each program for potentially varying third party graphics hardware would be a Herculean task, and would produce much inconsistency.

Consequently, generally the process of shading has been normalized to some degree. By passing source code designed to work with a shader into an application, a shader becomes an object that the application may create/utilize in order to facilitate the efficient drawing of complex video graphics. Vertex shaders and pixel shaders are examples of such shaders.

Prior to their current implementation in specialized hardware chips, vertex and pixel shaders were sometimes implemented wholly or mostly as software code, and sometimes implemented as a combination of more rigid pieces of hardware with software for controlling the hardware. These implementations frequently contained a CPU or emulated the existence of one using the system's CPU. For example, the hardware implementations directly integrated a CPU chip into their design to perform the processing functionality required of shading tasks. While a CPU adds a lot of flexibility to the shading process because of the range of functionality that a standard processing chip offers, the incorporation of a CPU adds overhead to the specialized shading process. Without today's hardware state of the art, however, there was little choice.

Today, though, existing advances in hardware technology have facilitated the ability to move functionality previously implemented in software into specialized hardware. As a result, today's pixel and vertex shaders are implemented as specialized and programmable hardware chips.

Unfortunately, programming such new vertex and pixel engines necessitates a meld of art and code resources never before required. Several digital content creation (DCC) applications have done an admirable job of supporting vertex and pixel shaders as far as they go, but it is not obvious how to allow artists to play with various shading options without having them become full-fledged shader programmers.

DISCLOSURE OF THE INVENTION

A method and computer program product are provided for generating a shader program. Initially, a file associated with a graphics effect is selected. Such file is then read and processed. A shader program is subsequently generated based on the processing of the file to apply the graphics effect to an object. Thus, a shader program may be correctly applied to an object for display or other purposes.

In one embodiment, the file may be selected from a library of files each associated with a unique graphics effect. Further, the file may include interface data capable of being processed to generate the shader program for different graphics application program interfaces. In a similar manner, the file may include implementation data capable of being processed to generate the shader program for different hardware graphics pipeline platforms. Thus, the file may be processed in a way to generate shader programs for working in conjunction with various different graphics application program interfaces (i.e. OpenGL®, Direct 3D™, etc.), and a variety of platforms (i.e. hardware graphics chips manufactured by different companies).

In another embodiment, the file may be written in an extensible markup language (XML). Moreover, the file may include a text file. Still yet, the selecting, reading, processing, and generating may be carried out utilizing an interface [i.e. Component Object Model (COM)], plug-in, etc.

As an option, the file may take the form of a data structure having a textual descriptive object for identifying a graphics effect associated with the file. Further provided may be a requirements object for identifying requirements necessary to generate the shader program.

Thus, the file may include requirements, with the shader program being generated based on the requirements. In general, the requirements may include a default set of requirements, which may be optionally custom tailored. Optionally, the requirements may include a call back function.

The file may further include a plurality of shader code segments capable of executing the graphics effect in a plurality of operating environments (i.e. platform implementation, interface, etc.). Such shader code segments may be organized in terms of the different operating environments. Thus, the present embodiment may optionally be used as a reference for obtaining desired shader code segments.

During operation of one particular embodiment, the processing may include initializing an interface. Such processing may further include registering custom types and/or custom functions. Thus, the shader program may be generated based on the registered custom types and/or custom functions. By this feature, the present embodiment allows a user to customize the resulting shader program.

Still yet, the processing may include setting up a plurality of objects, selecting one of the objects, selecting one of a plurality of graphics effects, selecting a render pass, setting up the render pass, and drawing the object with the selected graphics effect. As an option, the render pass may be set up by pointing to parameters so that the shader program may be generated based on the parameters. Further, the object may be drawn with the selected graphics effect utilizing attributes supplied by an application.

During a rendering pass, it may be determined whether more render passes exist, and another render pass selected if more render passes exist. Further, it may be determined whether more objects exist, and another object selected if more objects exist. Still yet, it may be determined whether more graphics effects exist, and another graphics effect selected if more graphics effects exist.

One exemplary system that may be used to carry the foregoing functionality may include an interface and an application program for working in conjunction to process a file. Thus, the shader program is generated based on the processing of the file to apply the graphics effect to the object.

As mentioned earlier, the processing includes setting up a plurality of objects. From the perspective of the application in the context of the present system embodiment, this may be accomplished by selecting a file associated with a graphics effect, selecting a graphics application program interface, and receiving implementation data representing a plurality of different hardware graphics pipeline platforms based on the selection. Next, parameters are received based on the implementation data. Further, it may be decided which of the hardware graphics pipeline platforms to use based at least in part on the parameters. By this design, the shader program is generated for use with the appropriate hardware graphics pipeline platform.

As an option, the decision as to which of the hardware graphics pipeline platforms is to be used may be based on whether the parameters are capable of being supplied. Still yet, the decision as to which of the hardware graphics pipeline platforms may be used is based on whether the parameters are understood (i.e., able to be correctly interpreted) by the application. Once such decisions have been made, attributes of an object are mapped to the parameters.

From the perspective of the interface in the context of the present system embodiment, the objects are set up by generating implementation data representing a plurality of different hardware graphics pipeline platforms. Parameters are then generated based on the implementation data. Still yet, the interface works in conjunction with the application to decide as to which of the hardware graphics pipeline platforms to use based on the parameters.

Optionally, the implementation data may be generated by determining whether the different hardware graphics pipeline platforms meet a plurality of requirements. Moreover, the implementation data may be further generated by sorting the different hardware graphics pipeline platforms that meet the requirements.

Associated with the foregoing framework is a computer-implemented method for generating a license agreement. Initially, a license agreement stored in memory is identified. Next, files associated with the license agreement are identified. It is then determined as to whether one or more files are not distributable.

If it is determined that one or more files are not distributable, a non-disclosure term is included in the license agreement.

Another computer implemented method is provided for determining whether a file is distributable. Such method may include identifying a file stored in memory, determining whether the file is distributable, and simply indicating whether the file is distributable.

In order to allow a user to visually experiment and use the shader program, an optional graphical user interface is provided. In use, the aforementioned graphics effect may be displayed utilizing such graphical user interface. Further, the graphics effect may be capable of being altered by a user utilizing the graphical user interface. In particular, the graphics effect may be capable of being altered by altering parameters, and the shader program may be generated based on the altered parameters. Such parameters may altered by tweaking the aforementioned file.

Another graphical user interface may also be provided in which a plurality of graphics effects are displayed for allowing a user to select one graphics effect. Such selected graphics effect is then displayed as applied to an object using a file. Further, the file is modified based on user input and the file is processed. Thus, the shader program may be generated based on the processing of the file.

As a further option, the interface may be capable of generating primitives. Further, the file may include a syntax including a name, a type and a content. Still yet, the file may be capable of referencing both compiled and un-compiled code.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which:

FIG. 1A-1 illustrates a more detailed diagram showing the internal structure of one exemplary embodiment of the hardware graphics pipeline of FIG. 1A.

FIG. 1A-2 illustrates an exemplary file that may be used to generate a shader program, in accordance with one embodiment.

FIG. 2 illustrates an "effect binding" method by which objects are set up in accordance with operation 1080 of FIGS. 1B and 1C.

DESCRIPTION OF THE PREFERRED EMBODIMENTS

Figure 1A:
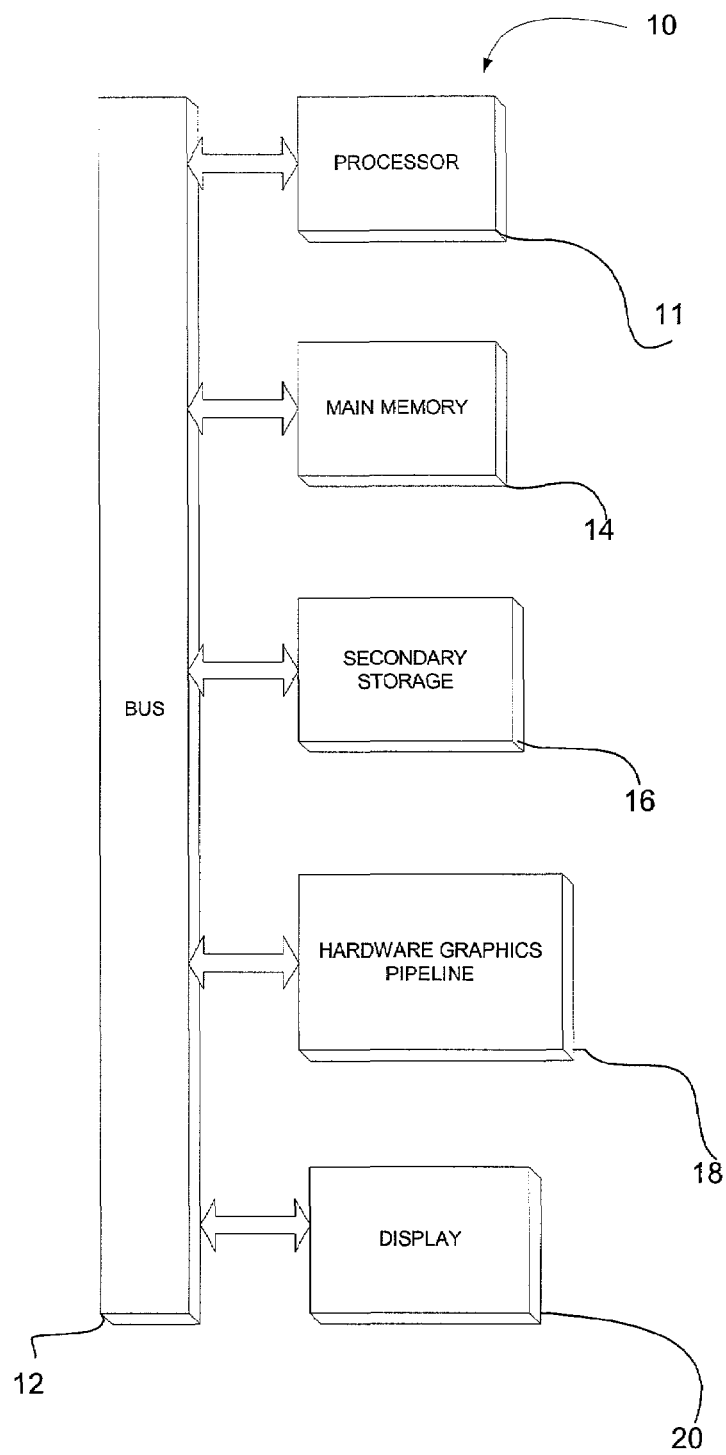
FIG. 1A is a block diagram of a digital processing system, in accordance with one embodiment.

FIG. 1A is a block diagram of a digital processing system, in accordance with one embodiment. With reference to FIG. 1A, a computer graphics system is provided that may be implemented using a computer 10. The computer 10 includes one or more processors, such as processor 11, which is connected to a communication bus 12. The bus 12 can be implemented with one or more integrated circuits, and perform some logic functions; for example, a typical personal computer includes chips known as north bridge and south bridge chips. The computer 10 also includes a main memory 14. Control logic (software) and data are stored in the main memory 14 which may take the form of random access memory (RAM). The computer also includes a hardware graphics pipeline 18 and a display 20, i.e. a computer monitor.

The computer 10 may also include a secondary storage 16. The secondary storage 16 includes, for example, a hard disk drive and/or a removable storage drive, representing a floppy disk drive, a magnetic tape drive, a compact disk drive, etc. The removable storage drive reads from and/or writes to a removable storage unit in a well known manner. Computer programs, or computer control logic algorithms, are stored in the main memory 14 and/or the secondary storage 16. Such computer programs, when executed, enable the computer 10 to perform various functions. Memory 14 and storage 16 are thus examples of computer-readable media.

In one embodiment, the techniques to be set forth are performed by the hardware graphics pipeline 18 which may take the form of hardware. Such hardware implementation may include a microcontroller or any other type of custom or application specific integrated circuit (ASIC). In yet another embodiment, the method of the present invention may be carried out in part on the processor 11 by way of a computer program stored in the main memory 14 and/or the secondary storage 16 of the computer 10. One exemplary architecture for the hardware graphics pipeline 18 will be set forth during reference to FIG. 1A-1.

Figures 1, 1A:
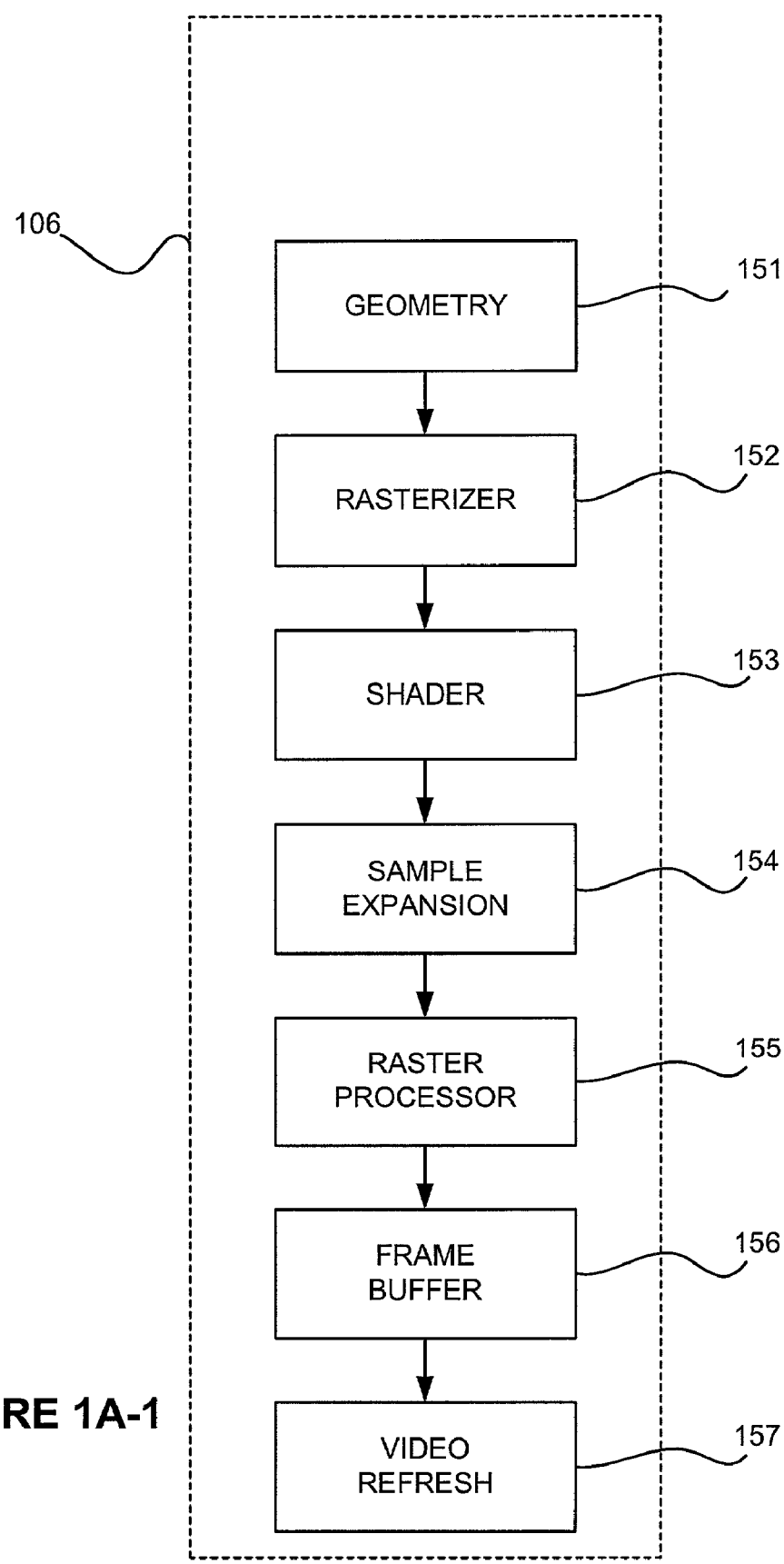

FIG. 1A-1 illustrates a more detailed diagram showing the internal structure of one exemplary embodiment of the hardware graphics pipeline 18 of FIG. 1A. As shown, a geometry stage 151 is provided which transforms primitives into a screen-aligned coordinate system. Other computations may be performed by the geometry stage 151 such as lighting to determine the visual properties (e.g., color, surface normal, texture coordinates) of each vertex describing the primitives.

The transformed vertices form the input for a rasterizer 152. The rasterizer 152 computes a fragment for each pixel covered by each of the primitives. A coverage mask stored with the fragment indicates which portions of the pixel the fragment covers.

Also included is a shader 153 that computes the final fragment, e.g. by applying texture maps or shader programs to the fragment. Such shader programs may be generated in various ways. One system and method for generating the shader programs will be set forth hereinafter in greater detail. It should be noted that in the context of the present description, shader programs may refer to vertex shader programs, pixel shader programs, or any other type of program capable of shading. An optional sample expansion stage 154 generates multiple samples for each fragment.

With continuing reference to FIG. 1A-1, after multi-sampling, the individual samples are sent to a raster-processor (ROP) 155 as if they were regular fragments. The raster-processor 155 performs various operations on the fragments, including z/stencil testing and color or alpha blending. This may require the raster-processor 155 to read a frame buffer memory 156 in order to retrieve the destination Z or the destination color. To this end, the final pixel color and Z are written back to the frame buffer memory 156.

When all primitives in the scene have been rendered in this manner, the contents of the frame buffer memory 156 are scanned out by a video refresh unit 157 and sent to the display 20.

In one embodiment, all of the foregoing components of the graphics system 106 except the frame buffer memory 156 (and possibly other memories, such as texture memory) may be situated on a single semiconductor platform. Of course, the various modules may also be situated separately or in various combinations of semiconductor platforms per the desires of the user.

An interface may be used in conjunction with the various components set forth in FIGS. 1A and 1A-1. In one embodiment, such interface may include at least in part the Open Graphics Library (OpenGL®), Direct3D™ application program interfaces (APIs), a proprietary application program interface, or the like.

In use, a shader program may be generated for use with the shader 153 of FIG. 1A-1. Initially, a single file associated with a graphics effect is a selected. Such file is then read and processed. In the context of the present description, a file may include any type of data structure, stream of data, network connection, etc. capable of communicating information. A shader program is subsequently generated based on the processing of the file to apply the graphics effect to an object. More information will now be set forth regarding various exemplary techniques in carrying out such functionality.

Figure 2:
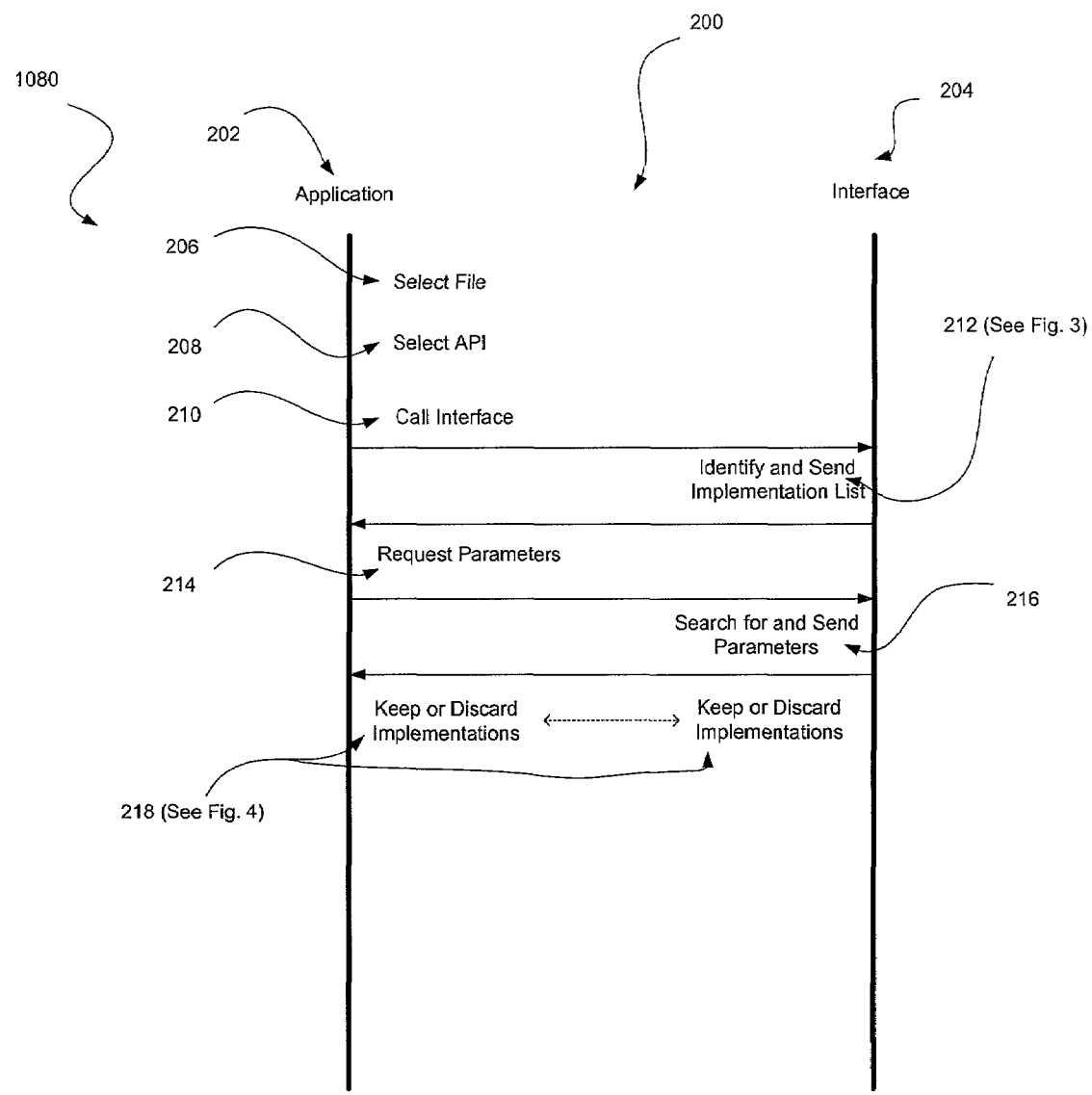

FIG. 1A-2 illustrates an exemplary file 160 that may be used to generate a shader program, in accordance with one embodiment. It should be noted that the present file 160 may be used to generate a shader program in the context of the foregoing architecture of FIGS. 1A and 1A-1, or any another architecture desired.

An exemplary file 160 is set forth in Appendix A. The lines in Appendix A are numbered for reference.

In one embodiment, the file 160 may be selected from a library of files each associated with a unique graphics effect. Internally, such libraries may use a particular class. Such class may be a hierarchical database very similar to a file system. It may support links and functions, and allow user-defined types and functions to override and intermix with the pre-existing functions. Other functions may also be involved including volatile functions that have the same structure as a regular function, however, volatile functions are always executed. Additionally, no time is spent checking if parameter dependencies have changed, as in the case of a regular function. Any function called by a volatile function is also treated as volatile for the duration of the function. The class is where files 160 may be stored and accessed at runtime. Further, the class may be dumped to text at any time to facilitate debugging and archiving.

As an option, the class may be compiled in order to make sure that links point to a valid field of the same type, and that functions are well formed. As an option, the function strings may be compiled into an internal byte-code style representation. The class may also support just-in-time compilation, so that if a function is never called, it is never compiled. One may compile sub-trees of the class as needed to ensure links and functions are correct and fully specified.

In another embodiment, the file 160 may be written in an extensible markup language (XML). Moreover, the file 160 may include a text file. The example file 160 shown in Appendix A is in XML.

As an option, the file 160 may include implementation data 161 capable of being processed to generate the shader program for different hardware graphics pipeline platforms. For example, the implementation data 161 may represent a variety of platforms (i.e. hardware graphics chips manufactured by different graphics companies for various purposes).

Still yet, the file 160 may include interface data 162 capable of being processed to generate the shader program for different graphics application program interfaces. In particular, the file 160 may be processed in a way to generate shader programs for working in conjunction with various different graphics application program interfaces (i.e. OpenGL®, Direct 3D™, etc). In Appendix A, the tag "<imps>" at line 30 designates implementations, and lines 31 and 378 designate the beginning of DirectX™8 and OpenGL® implementations, respectively.

With continuing reference to 1A-2, a textual descriptive object 164 may be provided for identifying a graphics effect associated with the file using intuitive text. For example, the graphics effect may include a "shiny" characteristic, as shown in FIG. 1A-2, and at lines 2 and 3 in Appendix A. Of course, any other type of visual effect (i.e. motion blur, etc.) may be described by the textual descriptive object 164. Ideally, such textual descriptive object 164 allows an intuitive identification of the graphics effect associated with a shader program to be generated.

Further provided is at least one requirements object 166 for identifying requirements necessary to generate the shader program. As shown, various requirements are set forth for each of a plurality of render passes identified by way of pass identifiers 168. For example, each render pass may have different required textures, render states, multipass effects, and sources of L-vectors, as well as tangent space requirements, texture type requirements, or any other type of capability required to display a shader program correctly. Optionally, the requirements may even include a call back function.

In Appendix A, the requirements for the DirectX8 are potentially different for the three implementations shown: (1) implementation 1, starting at line 32, has its requirements described in lines 37 through 50; (2) implementation 2, starting at line 185, has its requirements described in lines 190 through 199; and (3) implementation 3, starting at line 282, has its requirements described in lines 287 through 296. Note that implementations 2 and 3 have the same requirements, but implementation 1 has different requirements.

In general, the requirements may include a default set of requirements, which may be optionally custom tailored. Such tailorable requirements, or "tweakables," represent artist-controllable parameters for shader-specific items. Tweakables are required by a shader program, but are not necessarily exposed through standard tool paths. Shader program authors may decide which parts of the shader program to expose to artist manipulation. Tweakables may refer to any requirement ranging from a transparency factor to an alpha blend factor. Table 1 illustrates exemplary tweakables in the context of the file 160 of FIG. 1A-1.

TABLE 1

```
<tweakables>
    <shininess>
        <string name = "description" type = "value"
            content = "Relative Opacity" />
        <string name = "type" type = "value"
            content = "float" />
        <string name = "field" type = "value"
            content = ". ./. ./settings/opacity" />
        <string name = "gui" type = "value"
            content = "slider" />
        <float name = "min" type = "value"
            content = "0.0 "/>
        <float name = "max" type = "value"
            content = "1.0 "/>
        <float name = "step" type = "value"
            content = "0.1 "/>
    </shininess>
</tweakables>
```

In Appendix A, the tweakables are designated at lines 14 through 29. The tweakables are generally outside the designation of any of the implementations because they generally apply to all the implementations. In this example, a minimum value (lines 22 and 23), a maximum value (lines 24 and 25), and a step size (lines 26 and 27) are included.

Further provided with the file 160 is a plurality of shader code segments 170 capable of executing the graphics effect in a plurality of operating environments. As shown, such shader code segments 170 include a syntax including a name, a type and a content. Still yet, the file may be capable of referencing both compiled and un-compiled shader program code.

As shown in FIG. 1A-2, the shader code segments 170 may be organized in terms of the different operating environments. Thus, the present embodiment may optionally be used as a reference for obtaining desired shader code segments 170.

In Appendix A, an example of shader code is shown at lines 60 through 88.

Table 2 illustrates a summary of various elements of an exemplary shader implementation in Direct3D® 8.

TABLE 2

1. Preamble/declaration:

These elements provide a priority for a particular implementation/interface, and a string description of the implementation/interface.
2. Requirements:

These specify the various requirements for the implementation/interface to run correctly. In particular, they include the Dx8 caps that are required for the shader. All requirements evaluate to type 'bool'.
3. Texture handles:

These refer to texture handles that are created either from data in texture files (i.e. png, dds, tga, etc.) or generated textures such as normalization cube maps. The handles can be referenced in subsequent sections of the file, and are independent of the render pass or texture unit.
4. Vertex shader & Pixel Shader Handles:

These are the dx8-provided handles that are created either compiled shader strings or from precompiled shader files. The handles can be referenced in subsequent sections of the file, and are independent of the render pass or texture unit. If a user does not want a vertex shader applied, the handle may be set to the FVF code being used. If the user does not specify a pixel shader for a pass, it may be set to zero, thus turning off pixel shading.
5. Vertex Mapping:

This section is highly recommended and encouraged, but optional. This is where one may specify the meaning of the various vertex attributes, (such as v0, v1, v5) in a shader program. By specifying the mapping and exposing the shader program in string form, an application with a different geometry layout may have the shader program re-written with the new geometry format.
6. A shader implementation can comprise multiple render passes, each with unique render states, texture stage states, vertex mapping, pixel and vertex shaders.
7. There may be a file that represents the default render and texture stage states for the system. If one does not specify a renderstate or texture stage state in a pass of a shader program, it is reset to the default state in the file. By using the file, one may gain improved interoperability with shader programs that use the same file. If one does not wish to make changes, he or she can do so, but at the cost of having to update shaders to reflect the render state changes.

Table 3 illustrates a summary of various elements of an exemplary shader implementation in OpenGL®.

TABLE 3

1. Preamble/declaration:

These elements provide a priority for the implementation/ interface, and a string description of the implementation/ interface.
2. Requirements:

These specify the various requirements for the implementation/ interface to run correctly. In particular, they include the OpenGL ® extensions that are required for the shader. If these are not available, the OpenGL implementation may not load the shader program.

TABLE 3-continued

3. Texture handles:

These refer to texture handles that are created either from data in texture files (i.e. png, dds, tga, etc.) or generated textures such as normalization cube maps. The handles can be referenced in subsequent sections of the file, and are independent of the render pass or texture unit.
4. A shader implementation can comprise multiple render passes, each with a unique vertex program, texture shader and register combiner definitions.

Figure 1B:
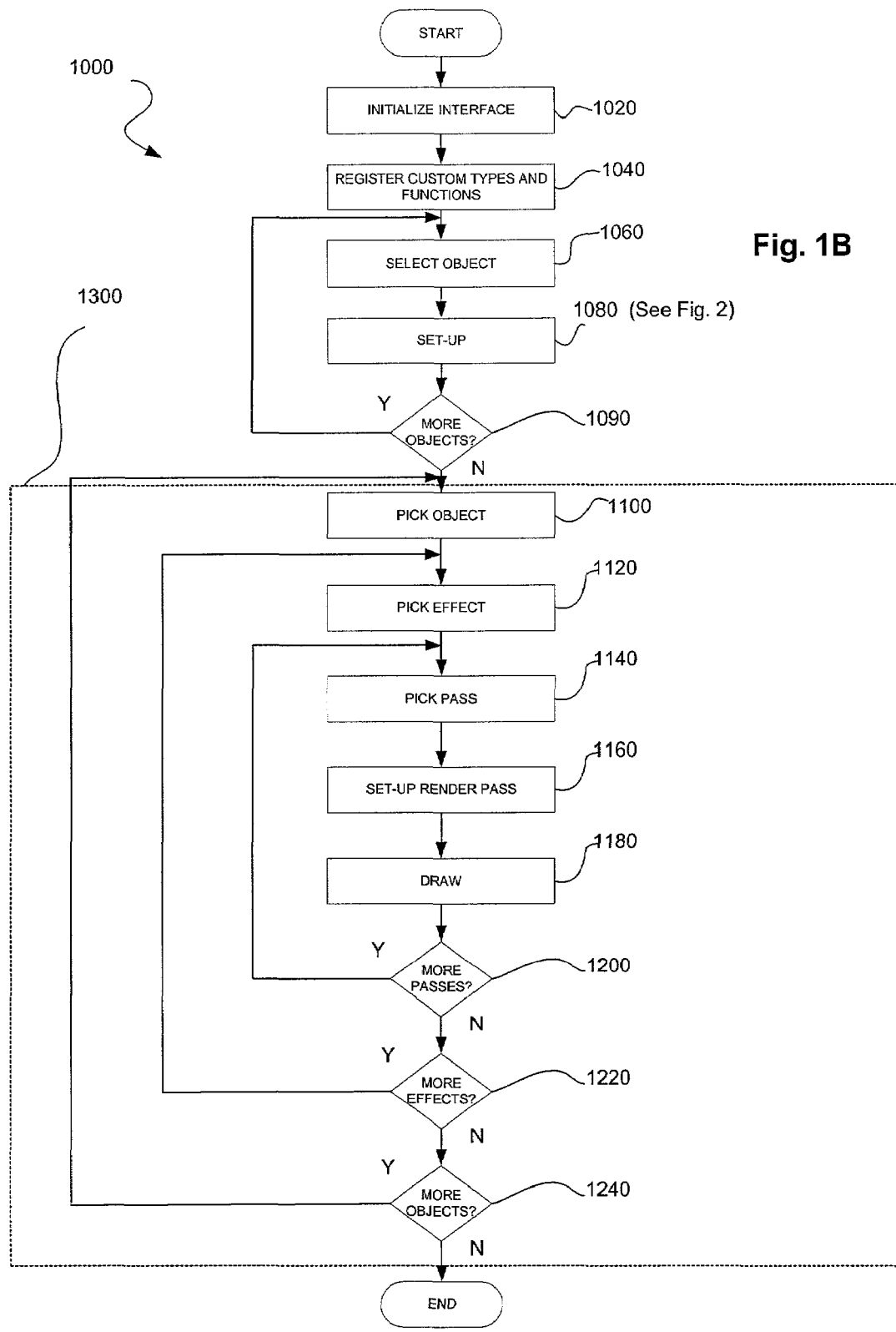
FIGS. 1B and 1C each illustrate a method for generating a shader program, in accordance with one embodiment.

FIG. 1B illustrates a method 1000 for generating a shader program, in accordance with one embodiment. This method 1000 is generally done under control of an application program that renders an image with one or more three-dimensional objects. While the present method 1000 may be implemented in the context of the framework of the foregoing figures, it may readily be implemented in the context of any desired architecture and data structure. As an option, the various operations may be carried out utilizing an interface [i.e. Component Object Model (COM)], plug-in, etc. Moreover, various steps may be optionally excluded and/or reordered during the course of the processing that is required to generate the shader program.

Initially, in operation 1020, the processing may include initializing an interface. In a preferred embodiment, the interface is an API to the library of effects, and can be implemented as a plug-in. Next, any number of custom types and custom functions are registered in operation 1040. Thus, the shader program may be generated based on the registered custom types and/or custom functions. By this feature, the present embodiment allows a user to customize the resulting shader program.

Next, one of the objects to be rendered is selected in operation 1060 after which such object is set up in operation 1080. This set up process is carried out for each of a plurality of objects to be rendered, as indicated by decision 1090. Thus, a plurality of objects is set up. This preparation facilitates the generation of the shader program by taking various information relating to the implementation and interface associated with the environment in which the shader program is to be used. More information relating to an exemplary embodiment of such set up operation will be set forth in greater detail during reference to FIGS. 2 through 4.

With continuing reference to FIG. 1B, one of the objects is selected along with one of a plurality of graphics effects, and a render pass. See operations 1100–1140. The selected render pass is then set up in operation 1160 after which the selected object is drawn with the selected graphics effect. See operation 1180. As an option, the render pass may be set up by pointing to parameters. The shader program may then be generated based on the parameters. Further, the object may be drawn with the selected graphics effect utilizing attributes supplied by an application. Parameters that are not passed in during render pass setup 1160 generally use default values supplied in the file 160. The parameters can be supplied in any order, and the use of pointers to the parameters provides a mechanism for parameters to be shared amongst a plurality of objects.

During a rendering pass, it may be determined whether more render passes exist, and another render pass selected if more render passes exist. See decision 1200. Further, it may be determined whether more graphics effects exist, and another graphics effect selected if more graphics effects exist. Note decision 1220. Still yet, it may be determined whether more objects exist, and another object selected if more objects exist, as indicated by decision 1240.

It should be noted that the various operations included in the box 1300 may be carried out in any order. See, for example, FIG. 1C. Of course, any feasible permutation of the operations may be employed.

Figure 1C:
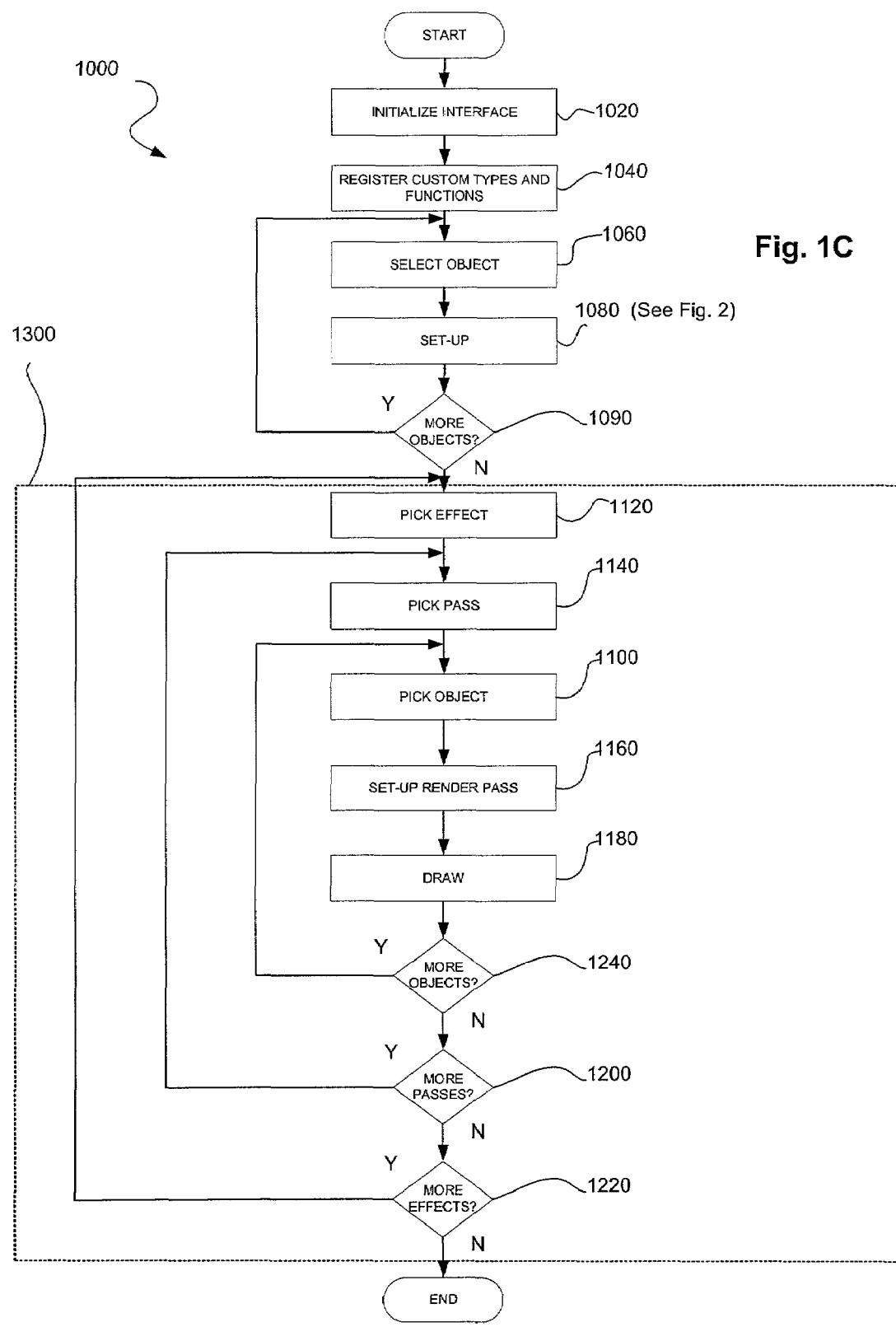

FIG. 2 illustrates an "effect binding" method 200 by which objects are set up in accordance with operation 1080 of FIGS. 1B and 1C. Such method 200 is carried out in the context of an exemplary system including an interface 204 and an application program 202 for working in conjunction to process the file. Thus, the shader program is generated based on the processing of the file to apply the graphics effect to the object. Of course, the present method 200 may be implemented in the context of any desired system.

As mentioned earlier, the processing includes setting up a plurality of objects. From the perspective of the application program 202 in the context of the present system embodiment, this may be accomplished by selecting a file associated with a desired graphics effect in operation 206. In one embodiment, a .dll file may be used by a tool or graphics engine to read the file.

Next, in operation 208, a graphics application program interface is selected. Thereafter, the interface 204 is called. See operation 210. In response to such call, implementation data representing a plurality of different hardware graphics pipeline platforms is received based on the selection of the particular graphics application program interface. In one embodiment, any platform that supports the selected graphics application program interface may be represented by the implementation data.

Next, parameters are requested and received based on the implementation data, as indicated by operation 214. Further, it may be decided which of the hardware graphics pipeline platforms to use based on the parameters in operation 218. As will soon become apparent, this decision may be made using the application program 202 in conjunction with the interface 204. More information relating to such decisions will be set forth in greater detail during reference to FIG. 4.

From the perspective of the interface 204 in the context of the present system embodiment, the objects are set up by generating implementation data representing a plurality of different hardware graphics pipeline platforms, in response to the call of operation 210. Note operation 212. More information as how this may be accomplished in accordance with one embodiment will be set forth with reference to FIG. 3. Parameters are then generated based on the implementation data in operation 216. As mentioned earlier, the interface 204 works in conjunction with the application 202 in operation 218 to decide as to which of the hardware graphics pipeline platforms to use based on the parameters.

As an option, the interface 204 may be capable of generating primitives. For example, a sphere may be generated from a point and radius, etc. This can be done by defining a geometry generator (for example, with a tag "<geogenerator>"), which is analogous to the pixel shader (as shown with the tag "<pixelshader>") or the vertex shader (as shown with the tag <vertexshader>"). This primitive generation technique may be useful in many contexts. For example, it may be used when generating grass or other similar objects.

Figure 3:
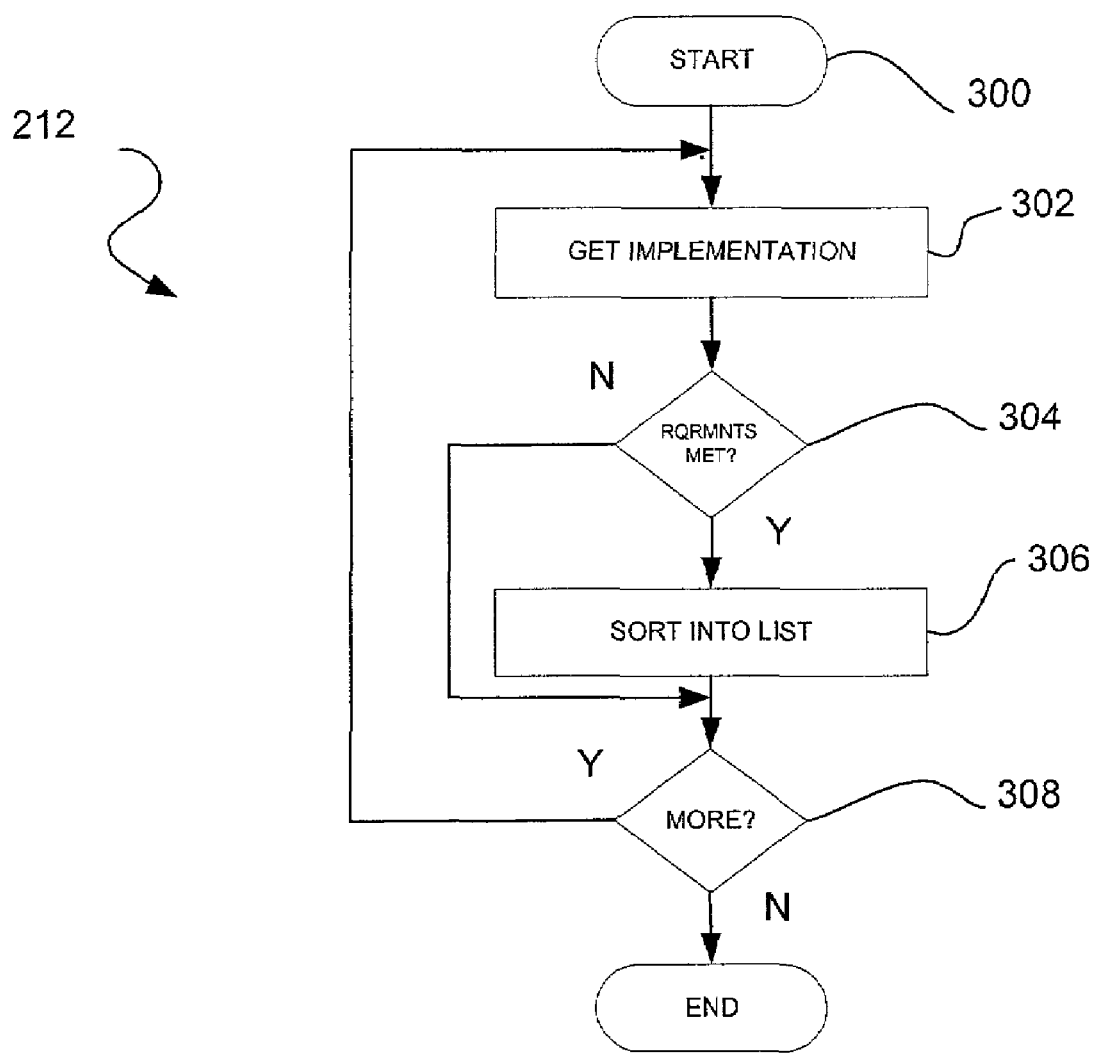
FIG. 3 illustrates a method for generating implementation data representing a plurality of different hardware graphics pipeline platforms, in accordance with operation 212 of FIG. 2.

FIG. 3 illustrates a method 300 for generating implementation data representing a plurality of different hardware graphics pipeline platforms, in accordance with operation 212 of FIG. 2. This method 300 is done within the interface 204. It should be noted that the present method 300 is set forth for illustrative purposes only, and should not be construed as limiting in any manner.

As shown in FIG. 3, implementation data is retrieved in operation 302, which, for example, finds all the implementations (inside the designation "<imps>", shown at line 30 in Appendix A) in the file 160. Next, it is determined whether the implementation data meets the requirements outlined under the appropriate graphics application program interface in the current file. If it is determined in decision 304 that the requirements are met, the implementation data is sorted in a list in operation 306. This may be accomplished using a floating point priority provided by a user. This process is continued for all implementation data associated with the selected graphics application program interface. Note decision 308.

Figure 4:
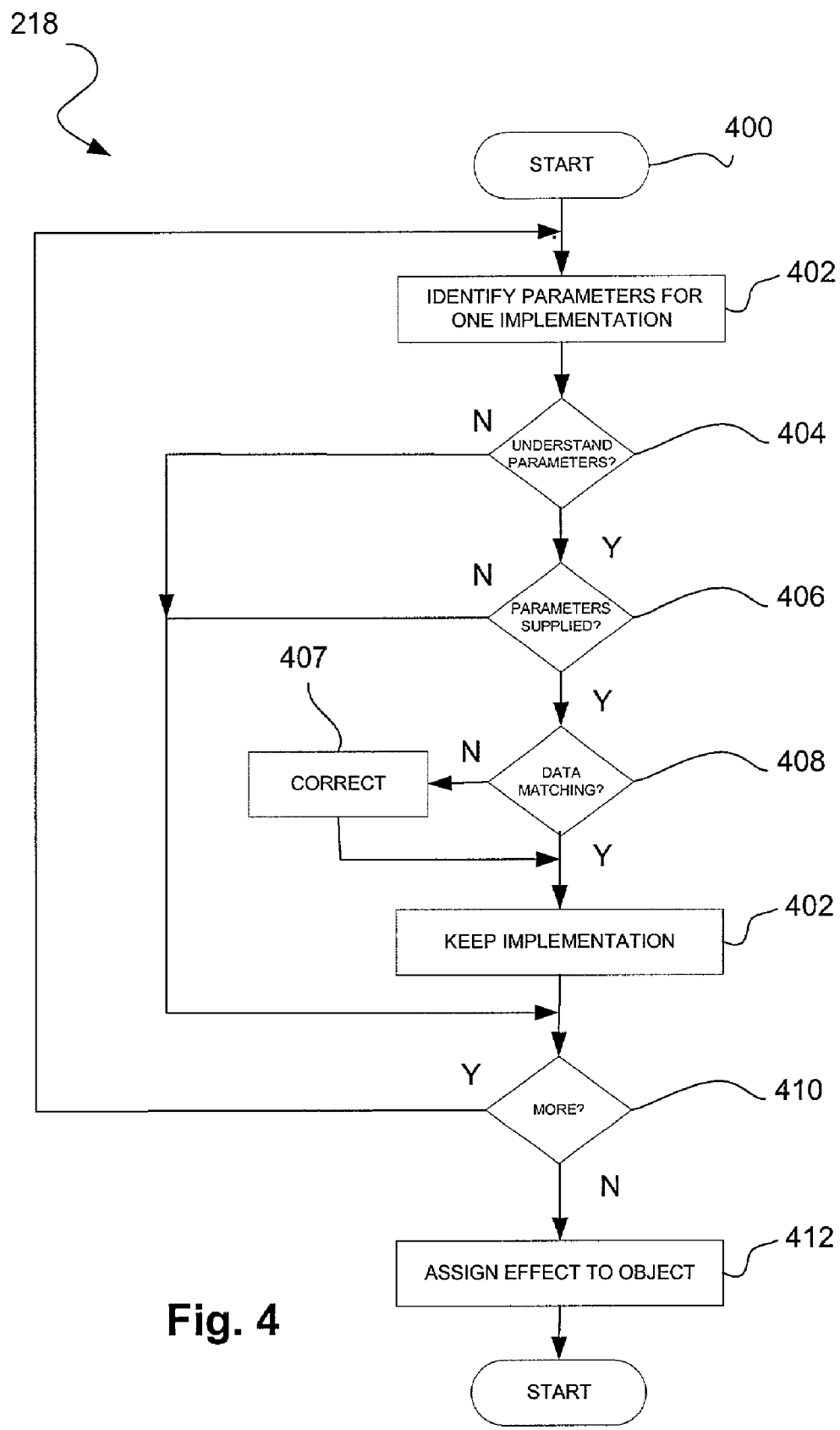
FIG. 4 illustrates an exemplary method by which it may be decided which of the hardware graphics pipeline platforms to use, in accordance with operation 218 of FIG. 2.

FIG. 4 illustrates an exemplary method 400 by which it may be decided which of the hardware graphics pipeline platforms to use, in accordance with operation 218 of FIG. 2. Generally, this method 400 is performed by the application 202. Again, it should be noted that the present method 400 is set forth for illustrative purposes only, and should not be construed as limiting in any manner.

Initially, in operation 402, the parameters associated with a particular implementation are identified. This is done by calling the interface and requesting the list of parameters for an implementation. Again, each implementation may correspond with a specific platform (i.e. hardware graphics chips manufactured by different graphics companies).

It is then determined, in decision 404, whether the parameters supplied by the interface are understood by the application (i.e., whether the parameter names can be correctly interpreted by the application). Further, it is determined whether the parameters can be supplied by the application. See decision 406. Both of these decisions must render a positive response if the present implementation is to be utilized by the application program. As an option, the current decisions can be carried out in a place other than the application program.

Next, in operation 408, it is determined whether data is matching. If not, any mismatching data is corrected in operation 407. The correction operation 407 can include, for example, swapping the order of the data and/or making the needed data from existing data. Unlike the previous decisions, the present decision 408 may optionally be carried out by the interface.

The foregoing decisions are made for each of the implementations that are available. See decision 410. Next, graphic effects are assigned to the object in operation 412. Generally, the application selects from the implementations kept in operation 402.

In order to allow a user to visually experiment and use a shader program, an optional graphical user interface is provided. In use, the aforementioned graphics effect may be displayed utilizing a graphical user interface. Further, the graphics effect may be capable of being altered by a user utilizing the graphical user interface. In particular, the graphics effect may be capable of being altered by altering parameters (i.e. tweakables), and the shader program may be generated based on the altered parameters. This may be accomplished by way of a sliders, edit boxes, etc. The parameters may be altered by tweaking the associated file.

Another graphical user interface may also be provided in which a plurality of graphics effects are displayed for allowing a user to select one graphics effect. Such selected graphics effect is then displayed as applied to an object using a file. Further, the file is modified based on user input and the file is processed. Thus, the shader program may be generated based on the processing of the file.

Figure 5:
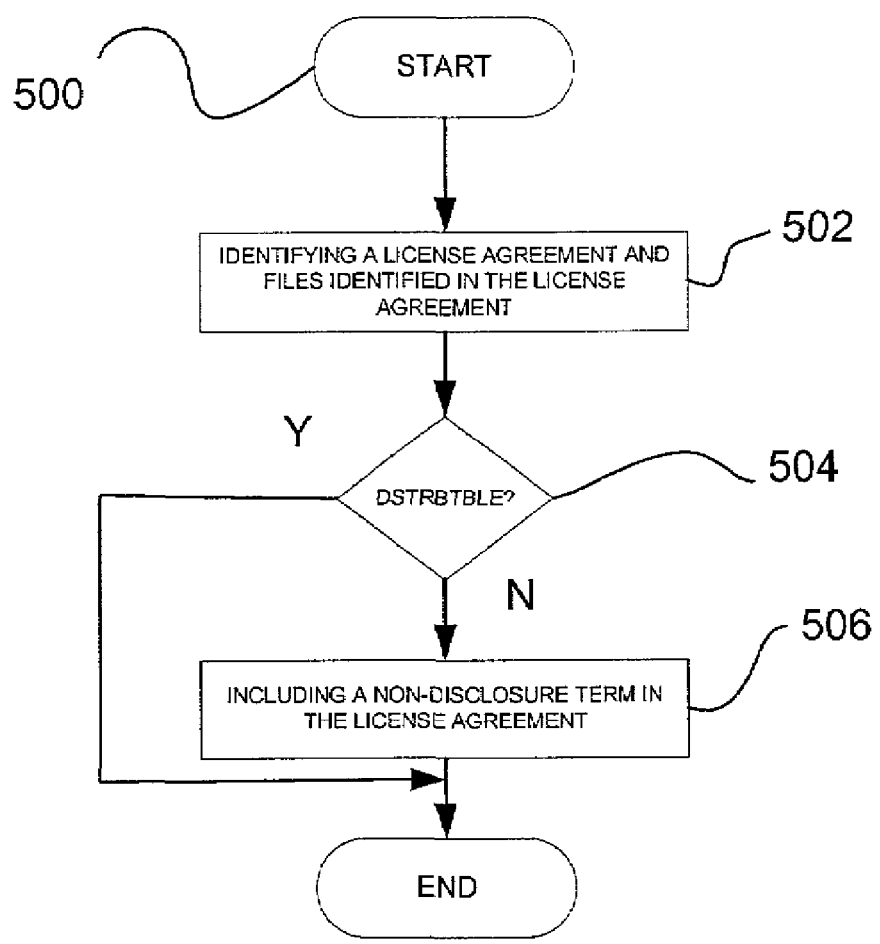
FIG. 5 illustrates a business method associated with the present invention.

FIG. 5 illustrates a business method 500 associated with the present invention. In use, the file (i.e. see FIG. 1A-1) may be sold or otherwise distributed by way of a license agreement. The various shader programs or portions thereof in the file may or may not be distributable to the public for one reason or another. The present computer-implemented business method 500 allows the automated generation of a license agreement that takes into consideration whether non-distributable shader programs exist in a particular file to be licensed.

Initially, in operation 502, a license agreement stored in memory is identified. Further, files associated with the license agreement are identified.

It is then determined as to whether one or more of the files are not distributable at least in part. See decision 506. This may be accomplished by specifically tagging non-distributable code, or comparing the contents of the file with a database of known non-distributable code.

If it is determined that one or more files are not distributable in decision 506, a non-disclosure term is included in the license agreement. This non-disclosure term may be of a boilerplate nature and incorporated into the license agreement automatically in any other manner that is well known to those of ordinary skill. See operation 508.

In a simplified associated computer-implemented method, a technique is provided for determining whether a file is distributable. Such method may include identifying a file stored in memory, determining whether the file is distributable, and simply indicating whether the file is distributable.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents. The order of elements within claims does not indicate any particular order of steps or operations.

APPENDIX A

```
 1  <depot>
 2    <description type = "string"
 3        value = "Apply Diffuse Texture and Glossy Reflection" />
 4    <equation type = "string"
 5        value = "object/diffuseTexture" />
 6    <categories>
 7      <Shiny type = "string"
 8          value = "Plain" />
 9    </categories>
10    <settings>
11      <shininess type = "float"
12          value = "0.800000" />
13    </settings>
14    <tweakables>
15      <shininess>
16        <description type = "string"
17            value = "Object Shininess" />
18        <element type = "float"
19            link = "nfx/[self]/settings/shininess" />
20        <gui type = "string"
21            value = "slider" />
22        <min type = "float"
23            value = "0.000000" />
24        <max type = "float"
25            value = "1.000000" />
26        <step type = "float"
27            value = "0.100000" />
28      </shininess>
29    </tweakables>
30    <imps>
31      <dx8>
32        <imp1>\
33          <priority type = "float"
34              value = "1.000000" />
35          <description type = "string"
36              value = "Shiny with Gloss Alpha Channel" />
37          <requirements>
38            <os type = "bool"
39                function = "GreaterEqual_float( parameters/os/version, float( 5.0 ) )" />
40            <api type = "bool"
41                function = "GreaterEqual_float( parameters/api/version, float( 8.0 ) )" />
42            <CubeTextureSupport type = "bool"
43                function = "AllSet( D3DCAPS8/TextureCaps, bitset( D3DPTEXTURECAPS_CUBEMAP ) )" />
44            <TextureSupport type = "bool"
45                function = "GreaterEqual_uint( D3DCAPS8/MaxSimultaneousTextures, uint( 2 ) )" />
46            <VertexShaders type = "bool"
47                function = "GreaterEqual_float( D3DCAPS8/VertexShaderVersion, float( 1.1 ) )" />
48            <PixelShaders type = "bool"
49                function = "GreaterEqual_float( D3DCAPS8/PixelShaderVersion, float( 1.1 ) )" />
50          </requirements>
51          <passes>
52            <passCount type = "uint"
53                value = "1" />
```

APPENDIX A-continued

```
54      <pass0>
55        <renderstates>
56          <D3DRS_CULLMODE type = "D3DCULL"
57            value = "D3DCULL_NONE" />
58        </renderstates>
59        <vertexshader>
60          <shader type = "string"
61            value = "va.1.1
62              mov ot0, v7
63              mul r0,     v0.x, c10
64              mad r0,     v0.y, c11, r0
65              mad r0,     v0.z, c12, r0
66              mad oPos,   v0.w, c13, r0
67              mul r0.xyz, v3.x, c4
68              mad r0.xyz, v3.y, c5, r0
69              mad r0.xyz, v3.z, c6, r0
70              dp3 r0.w, r0.xyz, r0.xyz
71              rsq r0.w, r0.w
72              mul r0, r0, r0.w
73              sge r0.w, r0.w, r0.w
74              mul r1, v0.x, c4
75              mad r1, v0.y, c5, r1
76              mad r1, v0.z, c6, r1
77              mad r1, v0.w, c7, r1
78              dp3 r1.w, r1.xyz, r1.xyz
79              rsq r1.w, r1.w
80              mul r1, r1, r1.w
81              sge r1.w, r1.w, r1.w
82              dp3 r2, r0, r1
83              add r2, r2, r2
84              mul r4.xyz, r1, r2
85              add oT1.xyz, r0, -r4
86              sge oT1.w, r0.w, r0.w
87              mov oD0, v5
88              mov oD1, v5 " />
89          <handle type = "uint"
90            function = "compile_dx8_vs( . . /shader )" />
91          <equation type = "string "
92            value = "dp3 R_DOT2, R_EYE_VECTOR, R_EYE_NORMAL
93              add R_DOT2, R_DOT2, R_DOT2
94              mul R_EYE_NORMAL, R_EYE_NORMAL, R_DOT2
95              add oT0, R_EYE_VECTOR, -R_EYE_NORMAL
96              mov oT0.w, c[CV_ONE].x " />
97          <mapping>
98            <v6 type = "string "
99              value = "position" />
100           <v3 type = "string"
101             value = "normal" />
102           <v5 type = "string"
103             value = "diffuse" />
104           <v7 type = "string"
105             value = "tex0" />
106         </mapping>
107         <constants>
108           <c20 type = "vector4"
109             value = "0.500000 0.500000 0.500000 0.000000" />
110           <c10 type = "matrix4"
111             link = "parameters/transforms/mvp" />
112           <c4 type = "matrix4"
113             function = "PostMul( parameters/transforms/world, parameters/transforms/view )" />
114         </constants>
115       </vertexshader>
116       <pixelshader>
117         <smooth_shader type = "string"
118           value = "ps.1.1
119             tex t0
120             tex t1
121             tex t2
122             sub r0, t0, t1
123             dp3 r0, r0, r0
124             sub r1, t2, t1
125             dp3 r1, r1, r1
126             sub t0.a, r0.a, r1.a
127             add_sat r0.a, t0.a, c0.a
128             cnd r0, r0.a, t0, t2
129             lrp r0.rgb, t1.a, t1, r0
130             + mov r0.a, t1.a " />
131         <shader type = "string"
132           value = "ps.1.1
```

APPENDIX A-continued

```
133                    tex t0
134                    tex t1
135                    mul_x2_sat r1, 1-t0.a, c0.a
136                    mad_sat r0, r1, t1, t0" />
137              <DVC_shader type = "string"
138                  value = "ps.1.1
139                    tex t0
140                    dp3_sat r0, t0, c0
141                    sub_sat r1, t0, r0
142                    mad_sat r0, c1.a, r1, t0 " />
143              <handle type = "uint"
144                  function = "compile_dx8_ps( . . ./shader )" />
145              <constants>
146                <c0 type = "vector4"
147                    function = "Construct_vector4_floats( float( 0.11 ),
148                        float( 0.20 ),
149                        float( 0.59 ),
150                        sfx/[self]/settings/shininess )" />
151                <c1 type = "vector4"
152                    function = "Construct_vector4_floats( float( 0.5 ).
153                        float( 0.5 ),
154                        float( 0.5 ),
155                        float( 0.8 ) ) " />
156              </constants>
157            </pixelshader>
158            <texturestages>
159              <stage0>
160                <D3DTSS_MINFILTER type = "D3DTEXTUREFILTERTYPE"
161                    value = "D3DTEXF_LINEAR" />
162                <D3DTSS_MIPFILTER type = "D3DTEXTUREFILTERTYPE"
163                    value = "D3DTEXF_LINEAR" />
164                <D3DTSS_MAGFILTER type = "D3DTEXTUREFILTERTYPE"
165                    value = "D3DTEXF_LINEAR" />
166              </stage0>
167              <stage1>
168                <D3DTSS_MINFILTER type = "D3DTEXTUREFILTERTYPE"
169                    value = "D3DTEXF_LINEAR" />
170                <D3DTSS_MIPFILTER type = "D3DTEXTUREFILTERTYPE"
171                    value = "D3DTEXF_LINEAR" />
172                <D3DTSS_MAGFILTER type = "D3DTEXTUREFILTERTYPE"
173                    value = "D3DTEXF_LINEAR" />
174              </stage1>
175            </texturestages>
176            <textures>
177              <t0 type = "uint"
178                  link = "parameters/object/texture/diffuse/_2D/R8G8B8A8/handle" />
179              <t1 type = "uint"
180                  link = "parameters/object/texture/normal/_2D/R8G8B8A8/handle" />
181            </textures>
182          </pass0>
183        </passes>
184    </imp1>
185    <imp2>
186      <priority type = "float"
187          value = "0.500000" />
188      <description type = "string"
189          value = "Shiny with Gloss Alpha Channel Fixed Function" />
190      <requirements>
191        <os type = "bool"
192            function = "GreaterEqual_float( parameters/os/version, float( 5.0 ) )" />
193        <CubeTextureSupport type = "bool"
194            function = "AllSet( D3DCAPS8/TextureCaps, bitset( D3DPTEXTURECAPS_CUBEMAP ) )" />
195        <api type = "bool"
196            function = "GreaterEqual_float( parameters/api/version, float( 8.0 ) )" />
197        <TextureSupport type = "bool"
198            function = "GreaterEqual_uint( D3DCAPS8/MaxSimultaneousTextures, uint( 2) )" />
199      </requirements>
200      <passes>
201        <passCount type = "uint"
202            value = "1" />
203        <pass0>
204          <renderstates>
205            <D3DRS_CULLMODE type = "D3DCULL"
206                value = "D3DCULL_NONE" />
207            <D3DRS_TEXTUREFACTOR type = "uint"
208                function = "vector4_to_d3dcolor( Construct_vector4_floats( float( 0.0 ),
209                    float( 0.0 ),
210                    float( 0.0 ),
211                    sfx/[self]/settings/shininess ) )" />
```

APPENDIX A-continued

```
212            </renderstates>
213            <transforms>
214              <D3DTS_WORLD type = "matrix4"
215                  link = "parameters/transforms/world" />
216              <D3DTS_VIEW type = "matrix4"
217                  link = "parameters/transforms/view" />
218              <D3DTS_PROJECTION type = "matrix4"
219                  link = "parameters/transforms/projection" />
220              <D3DTS_TEXTURE1 type = "matrix4"
221                  function = "Transpose( parameters/transforms/world )" />
222            </transforms>
223            <vertexshader>
224              <handle type = "uint"
225                  link = "parameters/object/vertex/FVF" />
226            </vertexshader>
227            <texturestages>
228              <stage0>
229                <D3DTSS_MINFILTER type = "D3DTEXTUREFILTERTYPE"
230                    value = "D3DTEXF_LINEAR" />
231                <D3DTSS_MIPFILTER type = "D3DTEXTUREFILTERTYPE"
232                    value = "D3DTEXF_LINEAR" />
233                <D3DTSS_MAGFILTER type = "D3DTEXTUREFILTERTYPE"
234                    value = "D3DTEXF_LINEAR" />
235                <D3DTSS_COLORARG1 type = "D3DTA"
236                    value = "D3DTA_TEXTURE" />
237                <D3DTSS_COLOROP type = "D3DTEXTUREOP"
238                    value = "D3DTOP_SELECTARG1" />
239                <D3DTSS_ALPHAARG1 type = "D3DTA"
240                    value = "D3DTA_TEXTURE | D3DTA_COMPLEMENT" />
241                <D3DTSS_ALPHAOP type = "D3DTEXTUREOP"
242                    value = "D3DTOP_MODULATE2X" />
243                <D3DTSS_ALPHAARG2 type = "D3DTA"
244                    value = "D3DTA_TFACTOR" />
245              </stage0>
246              <stage1>
247                <D3DTSS_TEXCOORDINDEX type = "D3DTSS_TCI"
248                    value = "D3DTSS_TCI_CAMERASPACEREFLECTIONVECTOR | 1" />
249                <D3DTSS_TEXTURETRANSFORMFLAGS type = "D3DTEXTURETRANSFORMFLAGS"
250                    value = "D3DTTFF_COUNT3" />
251                D3DTSS_MINFILTER type = "D3DTEXTUREFILTERTYPE"
252                    value = "D3DTEXF_LINEAR" />
253                <D3DTSS_MIPFILTER type = "D3DTEXTUREFILTERTYPE"
254                    value = "D3DTEXF_LINEAR" />
255                <D3DTSS_MAGFILTER type = "D3DTEXTUREFILTERTYPE"
256                    value = "D3DTEXF_LINEAR" />
257                <D3DTSS_COLORARG0 type = "D3DTA"
258                    value = "D3DTA_CURRENT" />
259                <D3DTSS_COLORARG1 type = "D3DTA"
260                    value = "D3DTA_TEXTURE" />
261                <D3DTSS_COLORARG2 type = "D3DTA"
262                    value = "D3DTA_CURRENT | D3DTA_ALPHAREPLICATE" />
263                <D3DTSS_COLOROP type = "D3DTEXTUREOP"
264                    value = "D3DTOP_MULTIPLYADD" />
265                <D3DTSS_ALPHAOP type = "D3DTEXTUREOP"
266                    value = "D3DTOP_SELECTARG1" />
267                <D3DTSS_ALPHAARG1 type = "D3DTA"
268                    value = "D3DTA_CURRENT" />
269              </stage1>
270            </texturestages>
271            <pixelshader>
272            </pixelshader>
273            <textures>
274              <t0 type = "uint"
275                  link = "parameters/object/texture/diffuse/_3D/R8G8B8A8/handle" />
276              <t1 type = "uint"
277                  link = "parameters/locale/texture/environment/cube/R8G8B8A8/handle" />
278            </textures>
279          </pass0>
280        </passes>
281      </imp2>
282      <imp3>
283        <priority type = "float"
284            value = "0.600000" />
285        <description type = "string"
286            value = "Shiny with Gloss Alpha Channel Fixed Function" />
287        <requirements>
288          <os type = "bool"
289              function = "GreaterEqual_float( parameters/os/version, float( 5.0 ) )" />
290          <CubeTextureSupport type = "bool"
```

APPENDIX A-continued

```
291              function = "AllSet( D3DCAPS8/TextureCaps, bitset( D3DPTEXTURECAPS_CUBEMAP ) )" />
292         <api type = "bool"
293              function = "GreaterEqual_float( parameters/api/version, float( 8.0 ) )" />
294         <TextureSupport type = "bool"
295              function = "GreaterEqual_uint( D3DCAPS8/MaxSimultaneousTextures, uint( 2 ) )" />
296       </requirements>
297       <passes>
298         <passCount type = "uint"
299              value = "1" />
300         <pass0>
301           <renderstates>
302             <D3DRS_CULLMODE type = "D3DCULL"
303                 value = "D3DCULL_NONE" />
304             <D3DRS_TEXTUREFACTOR type = "uint"
305                 function = "vector4_to_d3dcolor( Construct_vector4_floats( float( 0.0 ),
306                              float( 0.0 ),
307                              float( 0.0 ),
308                              sfx/[self]/settings/shininess ) )" />
309           </renderstates>
310           <transforms>
311             <D3DTS_WORLD type = "matrix4"
312                 link = "parameters/transforms/world" />
313             <D3DTS_VIEW type = "matrix4"
314                 link = "parameters/transforms/view" />
315             <D3DTS_PROJECTION type = "matrix4"
316                 link = "parameters/transforms/projection" />
317             <D3DTS_TEXTURE1 type = "matrix4"
318                 function = "Transpose( parameters/transforms/world )" />
319           </transforms>
320           <vertexshader>
321             <handle type = "uint"
322                 link = "parameters/object/vertex/FVF" />
323           </vertexshader>
324           <texturestages>
325             <stage0>
326               <D3DTSS_MINFILTER type = "D3DTEXTUREFILTERTYPE"
327                   value = "D3DTEXF_LINEAR" />
328               <D3DTSS_MIPFILTER type = "D3DTEXTUREFILTERTYPE"
329                   value = "D3DTEXF_LINEAR" />
330               <D3DTSS_MAGFILTER type = "D3DTEXTUREFILTERTYPE"
331                   value = "D3DTEXF_LINEAR" />
332               <D3DTSS_COLORARG1 type = "D3DTA"
333                   value = "D3DTA_TEXTURE" />
334               <D3DTSS_COLOROP type = "D3DTEXTUREOP"
335                   value = "D3DTOP_SELECTARG1" />
336               <D3DTSS_ALPHAARG1 type = "D3DTA"
337                   value = "D3DTA_TFACTOR" />
338               <D3DTSS_ALPHAOP type = "D3DTEXTUREOP"
339                   value = "D3DTOP_MODULATE2X" />
340               <D3DTSS_ALPHAARG2 type = "D3DTA"
341                   value = "D3DTA_TEXTURE" />
342             </stage0>
343             <stage1>
344               <D3DTSS_TEXCOORDINDEX type = "D3DTSS_TCI"
345                   value = "D3DTSS_TCI_CAMERASPACEREFLECTIONVECTOR | 1" />
346               <D3DTSS_TEXTURETRANSFORMFLAGS type = "D3DTEXTURETRANSFORMFLAGS"
347                   value = "D3DTTFF_COUNT3" />
348               <D3DTSS_MINFILTER type = "D3DTEXTUREFILTERTYPE"
349                   value = "D3DTEXF_LINEAR" />
350               <D3DTSS_MIPFILTER type = "D3DTEXTUREFILTERTYPE"
351                   value = "D3DTEXF_LINEAR" />
352               <D3DTSS_MAGFILTER type = "D3DTEXTUREFILTERTYPE"
353                   value = "D3DTEXF_LINEAR" />
354               <D3DTSS_COLORARG0 type = "D3DTA"
355                   value = "D3DTA_CURRENT" />
356               <D3DTSS_COLOROP type = "D3DTEXTUREOP"
357                   value = "D3DTOP_MODULATEALPHA_ADDCOLOR" />
358               <D3DTSS_COLORARG1 type = "D3DTA"
359                   value = "D3DTA_TEXTURE" />
360               <D3DTSS_ALPHAARG1 type = "D3DTA"
361                   value = "D3DTA_TEXTURE" />
362               <D3DTSS_ALPHAOP type = "D3DTEXTUREOP"
363                   value = "D3DTOP_SELECTARG1" />
364             </stage1>
365           </texturestages>
366           <pixelshader>
367           </pixelshader>
368           <textures>
369             <t0 type = "uint"
```

APPENDIX A-continued

```
370                    link = "parameters/object/texture/diffuse/_2D/R8G8B8A8/handle" />
371                <t1 type = "uint"
372                    link = "parameters/locale/texture/environment/cube/R8G8B8A8/handle" />
373                </textures>
374            </pass0>
375        </passes>
376    </imp3>
377  </dx8>
378  <og1>
379    <imp1>
380       <element name = "priority"
381           type = "float"
382           value = "1.000000" />
383       <element name = "description"
384           type = "string"
385           value = "Shiny with Gloss Alpha Channel" />
386       <requirements>
387         <element name = "os"
388             type = "bool"
389             function = "GreaterEqual_float( parameters/os/version, float( 5.0 ) )" />
390         <element name = "api"
391             type = "bool"
392             function = "GreaterEqual_float( parameters/api/version, float( 1.0 ) )" />
393         <element name = "registerCombinerSupport"
394             type = "bool"
395             function = "RequiredNumRegisterCombiners(uint(2))" />
396         <extensions>
397           <element name = "GL_NV_vertex_program"
398               type = "bool"
399               function = "InitExtension(string(GL_NV_vertex_program))" />
400           <element name = "GL_NV_register_combiners"
401               type = "bool"
402               function = "InitExtension(string(GL_NV_register_combiners))" />
403           <element name = "GL_ARB_texture_compression"
404               type = "bool"
405               function = "InitExtension(string(GL_ARB_texture_compression))" />
406           <element name = "GL_EXT_texture_compression_e3tc"
407               type = "bool"
408               function = "InitExtension(string(GL_EXT_texture_compression_e3tc))" />
409         </extensions>
410       </requirements>
411       <textureHandles>
412         <handle0>
413           <element name = "name"
414               type = "string"
415               value = "decalTex" />
416           <element name = "handle"
417               type = "GLuint"
418               function = "sfx_glGenTexture( )" />
419           <element name = "data"
420               type = "sfxTexData"
421               function =
422                   "LoadTextureDataFromFile(string(stonearchaic.tga),string(rgb))" />
423           <element name = "mipmap"
424               type = "bool"
425               value = "true" />
426           <element name = "target"
427               type = "sfx_GLenum"
428               value = "GL_TEXTURE_2D" />
429           <element name = "internalFormat"
430               type = "sfx_GLenum"
431               value = "GL_RGB8" />
432           <element name = "externalFormat"
433               type = "sfx_GLenum"
434               value = "GL_RGB" />
435           <element name = "dataType"
436               type = "sfx_GLenum"
437               value = "GL_UNSIGNED_BYTE" />
438         </handle0>
439         <handle1>
440           <element name = "name"
441               type = "string"
442               value = "envmap" />
443           <element name = "data"
444               type = "sfxTexData"
445               function =
446                   "LoadTextureDataFromFile(string(sky_cube_mipmap.dds),string(null))" />
447           <element name = "mipmap"
448               type = "bool"
```

APPENDIX A-continued

```
449                    value = "true" />
450                <element name = "target"
451                    type = "sfx_GLenum"
452                    value = "GL_TEXTURE_CUBE_MAP_EXT" />
453                <element name = "GL_TEXTURE_WRAP_S"
454                    type = "sfx_GLenum"
455                    value = "GL_CLAMP_TO_EDGE" />
456                <element name = "GL_TEXTURE_WRAP_T"
457                    type = "sfx_GLenum"
458                    value = "GL_CLAMP_TO_EDGE" />
459                <element name = "GL_TEXTURE_WRAP_R"
460                    type = "sfx_GLenum"
461                    value = "GL_CLAMP_TO_EDGE" />
462                <element name = "GL_TEXTURE_MIN_FILTER"
463                    type = "sfx_GLenum"
464                    value = "GL_LINEAR" />
465                <element name = "GL_TEXTURE_MAG_FILTER"
466                    type = "sfx_GLenum"
467                    value = "GL_LINEAR" />
468            </handle1>
469        </textureHandles>
470        <passes>
471            <element name = "passCount"
472                type = "uint"
473                value = "1" />
474            <pass0>
475                <transforms>
476                    <model type = "matrix4"
477                    link = "parameters/transforms/world" />
478                    <view type = "matrix4"
479                    link = "parameters/transforms/view" />
480                    <projection type = "matrix4"
481                    link = "parameters/transforms/projection" />
482                </transforms>
483                <vertexshader>
484                    <mapping>
485                        <element name ="v(OPOS)"
486                            type = "string"
487                            value = "position" />
488                        <element name = "v[NRML]"
489                            type = "string"
490                            value = "normal" />
491                        <element name = "v[COL0]"
492                            type = "string"
493                            value = "diffuse" />
494                        <element name = "v[TEX0] "
495                            type = "string"
496                            value = "tex0" />
497                    </mapping>
498                    <element name = "shader"
499                        type = "string"
500                        value = "!!VP1.0
501                            MOV    o[TEX0], v[TEX0];
502                            DP4    o[HPOS].x, c[0], v[OPOS];
503                            DP4    o[HPOS].y, c[1], v[OPOS];
504                            DP4    o[HPOS].z, c[2], v[OPOS];
505                            DP4    o[HPOS].w, c[3], v[OPOS];
506                            DP4    R0.x, c[8], v[NRML];
507                            DP4    R0.y, c[9], v[NRML];
508                            DP4    R0.z, c[10], v[NRML];
509                            DP3    R0.w, R0, R0;
510                            RSQ    R0.w, R0.w;
511                            MUL    R0, R0, R0.w;
512                            SGE    R0.w, R0.w, R0.w;
513                            DP4    R1.x, c[4], v[OPOS];
514                            DP4    R1.y, c[5], v[OPOS];
515                            DP4    R1.z, c[6], v[OPOS];
516                            DP4    R1.w, c[7], v[OPOS];
517                            DP3    R1.w, R1, R1;
518                            RSQ    R1.w, R1.w;
519                            MUL    R1, R1, R1.w;
520                            SGE    R1.w, R1.w, R1.w;
521                            DP3    R2, R0, R1;
522                            ADD    R2, R2, R2;
523                            MUL    R4.xyz, R1, R2;
524                            ADD    o[TEX1].xyz, R0, -R4;
525                            SGE    o[TEX1].w, R0.w, R0.w;
526                            MOV    o[COL0], v[COL0];
527                            MOV    o[COL1], v[COL0];
```

APPENDIX A-continued

```
528                        END" />
529                    <element name = "handle"
530                        type = "og1_vs_handle"
531                        function = "compile_og1_vs_handle( . . /shader )" />
532                    <constants>
533                      <element name = "c0"
534                        type = "nvTrackMatrixParams"
535                        value = "GL_MODELVIEW_PROJECTION_NV GL_IDENTITY_NV" />
536                      <element name = "c4"
537                        type = "nvTrackMatrixParams"
538                        value = "GL_MODELVIEW GL_IDENTITY_NV" />
539                      <element name = "c8"
540                        type = "nvTrackMatrixParams"
541                        value = "GL_MODELVIEW GL_INVERSE_TRANSPOSE_NV" />
542                    </constants>
543                  </vertexshader>
544                  <textures>
545                    <unit0>
546                      <element name = "handle"
547                        type = "string"
548                        link = "sfx/[self]/imps/og1/imp1/textureHandles/handle0/name" />
549                    </unit0>
550                    <unit1>
551                      element name = "handle"
552                        type = "string"
553                        link = "sfx/[self]/imps/og1/imp1/textureHandles/handle1/name" />
554                    </unit1>
555                  </textures>
556                  <registercombiners>
557                    <constants>
558                      <element name = "const0"
559                        type = "vector4"
560                        function = "Construct_vector4_floats( float( 0.0 ),
561                                    float( 0.0 ),
562                                    float( 0.0),
563                                    sfx/[self]/settings/shininess )" />
564                    </constants>
565                    <element name = "nvparseInlineRegisterCombiner"
566                      type = "string"
567                      value = "!!RC1.0
568                               {
569                                 rgb {
570                                   spare0 = unsigned_invert(tex0.a) * const0.a;
571                                   scale_by_two( );
572                                 }
573                               }
574                               {
575                                 rgb {
576                                   discard = unsigned(spare0)*tex1;
577                                   discard = tex0;
578                                   spare0 = sum( );
579                                 }
580                               }
581                               out.rgb = spare0; " />
582                    <element name = "handle"
583                      type = "og1_rc_handle"
584                      function = "compile_og1_rc_handle( . . /nvparseInlineRegisterCombiner )" />
585                  </registercombiners>
586                </pass0>
587              </passes>
588           </imp1>
589        </og1>
590     </imps>
591  </depot>
```

What is claimed is:

1. A method for generating a shader program, comprising:

selecting a file associated with a graphics effect;

reading the file;

processing the file; and generating the shader program based on the processing of the file to apply the graphics effect to an object;

wherein the shader program is capable of being altered by tweaking the file.

2. The method as recited in claim 1, wherein the file is selected from a library of files each associated with a unique graphics effect.

3. The method as recited in claim 1, wherein the file is written in an extensible markup language (XML).

4. The method as recited in claim 1, wherein the file includes a text file.

5. The method as recited in claim 1, wherein the selecting, reading, processing, and generating are carried out utilizing an interface.

6. The method as recited in claim 5, wherein the interface includes a Component Object Model (COM) interface.

7. The method as recited in claim 5, wherein the processing includes initializing the interface.

8. The method as recited in claim 5, wherein the interface is capable of generating primitives.

9. The method as recited in claim 1, wherein the processing includes registering at least one of custom types and custom functions, the shader program being generated based on the at least one of registered custom types and custom functions.

10. The method as recited in claim 1, wherein the processing includes setting up a plurality of objects.

11. The method as recited in claim 10, wherein the processing includes selecting one of the objects.

12. The method as recited in claim 11, wherein the processing includes selecting one of a plurality of graphics effects.

13. The method as recited in claim 12, wherein the processing includes selecting a render pass.

14. The method as recited in claim 13, wherein the processing includes setting up the render pass.

15. The method as recited in claim 14, wherein the render pass is set up by pointing to parameters, the shader program being generated based on the parameters.

16. The method as recited in claim 14, wherein the processing includes drawing the object with the selected graphics effect.

17. The method as recited in claim 16, wherein the object is drawn with the selected graphics effect utilizing attributes supplied by an application.

18. The method as recited in claim 16, wherein the processing includes determining whether more render passes exist, and selecting another render pass if more render passes exist.

19. The method as recited in claim 1, wherein the file includes requirements, the shader program being generated based on the requirements.

20. The method as recited in claim 1, wherein the graphics effect is displayed utilizing a graphical user interface.

21. The method as recited in claim 20, wherein the graphics effect is capable of being altered by a user utilizing the graphical user interface.

22. The method as recited in claim 21, wherein the graphics effect is capable of being altered by altering parameters.

23. The method as recited in claim 22, wherein the shader program is generated based on the altered parameters.

24. The method as recited in claim 1, wherein the file includes a syntax including a name, a type and a content.

25. A method for generating a shader program, comprising:
   selecting a file associated with a graphics effect;
   reading the file;
   processing the file; and
   generating the shader program based on the processing of the file to apply the graphics effect to an object;
   wherein the file includes a plurality of interface data capable of being processed to generate the shader program for different graphics application program interfaces.

26. A method for generating a shader program, comprising:
   selecting a file associated with a graphics effect;
   reading the file;
   processing the file; and
   generating the shader program based on the processing of the file to apply the graphics effect to an object;
   wherein the file includes a plurality of implementation data capable of being processed to generate the shader program for different hardware graphics pipeline platforms.

27. A method for generating a shader program, comprising:
   selecting a file associated with a graphics effect;
   reading the file;
   processing the file; and
   generating the shader program based on the processing of the file to apply the graphics effect to an object;
   wherein the selecting, reading, processing, and generating are carried out utilizing a plug-in.

28. A method for generating a shader program, comprising:
   selecting a file associated with a graphics effect;
   reading the file;
   processing the file; and
   generating the shader program based on the processing of the file to apply the graphics effect to an object;
   wherein the processing includes setting up a plurality of objects;
   wherein the processing includes selecting one of the objects;
   wherein the processing includes selecting one of a plurality of graphics effects;
   wherein the processing includes selecting a render pass;
   wherein the processing includes setting up the render pass;
   wherein the processing includes drawing the object with the selected graphics effect;
   wherein the processing includes determining whether more objects exist, and selecting another object if more objects exist.

29. A method for generating a shader program, comprising:
   selecting a file associated with a graphics effect;
   reading the file;
   processing the file; and
   generating the shader program based on the processing of the file to apply the graphics effect to an object;
   wherein the processing includes setting up a plurality of objects;
   wherein the processing includes selecting one of the objects;
   wherein the processing includes selecting one of a plurality of graphics effects;
   wherein the processing includes selecting a render pass;
   wherein the processing includes setting up the render pass;
   wherein the processing includes drawing the object with the selected graphics effect;
   wherein the processing includes determining whether more graphics effects exist, and selecting another graphics effect if more graphics effects exist.

30. A method for generating a shader program, comprising:
   selecting a file associated with a graphics effect;
   reading the file;
   processing the file; and
   generating the shader program based on the processing of the file to apply the graphics effect to an object;
   wherein the file includes requirements, the shader program being generated based on the requirements;

wherein the requirements include a default set of requirements.

31. A method for generating a shader program, comprising:
   selecting a file associated with a graphics effect;
   reading the file;
   processing the file; and
   generating the shader program based on the processing of the file to apply the graphics effect to an object;
   wherein the file is capable of referencing both compiled and un-compiled code.

32. A system for generating a shader program, comprising:
   an interface;
   an application program for working in conjunction with the interface to process a file; and
   wherein the shader program is generated based on the processing of the file to apply the graphics effect to an object;
   wherein the shader program is capable of being altered by tweaking the file.

33. A system for generating a shader program, comprising:
   means for selecting a file associated with a graphics effect;
   means for reading the file;
   means for processing the file; and
   means for generating the shader program based on the processing of the file to apply the graphics effect to an object;
   wherein the shader program is capable of being altered by tweaking the file.

34. A computer program product for generating a shader program, comprising:
   computer code for selecting a file associated with a graphics effect;
   computer code for reading the file;
   computer code for processing the file; and
   computer code for generating the shader program based on the processing of the file to apply the graphics effect to an objects;
   wherein the shader program is capable of being altered by tweaking the file.

35. A data structure stored in memory for generating a shader program, comprising:
   a file including:
      a textual descriptive object for identifying a graphics effect associated with the file, and
      a requirements object for identifying requirements for the shader program necessary to generate the shader program;
   wherein the shader program is capable of being generated based on the objects of the file;
   wherein the shader program is capable of being altered by tweaking the file.

36. A method for generating a shader program utilizing an application, comprising:
   selecting a file associated with a graphics effect;
   selecting a graphics application program interface;
   receiving implementation data representing a plurality of different hardware graphics pipeline platforms based on the selection;
   receiving parameters based on the implementation data; and
   deciding which of the hardware graphics pipeline platforms to use based on the parameters;
   wherein the shader program is generated for use with the hardware graphics pipeline platforms.

37. The method as recited in claim 36, wherein the decision as to which of the hardware graphics pipeline platforms is to be used is based on whether the parameters are capable of being supplied.

38. The method as recited in claim 36, wherein the decision as to which of the hardware graphics pipeline platforms is to be used is based on whether the parameters are understood.

39. The method as recited in claim 36, and further comprising mapping attributes of an object to the parameters.

40. A method for generating a shader program utilizing an interface, comprising:
   generating implementation data representing a plurality of different hardware graphics pipeline platforms;
   generating parameters based on the implementation data; and
   deciding which of the hardware graphics pipeline platforms to use based on the parameters;
   wherein the shader program is generated for use with the hardware graphics pipeline platforms.

41. The method as recited in claim 40, wherein the implementation data is generated by determining whether the different hardware graphics pipeline platforms meet a plurality of requirements.

42. The method as recited in claim 41, wherein the implementation data is further generated by sorting the different hardware graphics pipeline platforms that meet the requirements.

43. A method for generating a shader program, comprising:
   initializing an interface;
   registering at least one of custom types and custom functions;
   setting up a plurality of objects;
   selecting one of the objects;
   selecting one of a plurality of graphics effects;
   selecting a render pass;
   setting up the render pass by pointing to parameters;
   drawing the object with the selected graphics effect;
   determining whether more render passes exist;
   selecting another render pass if more render passes exist;
   determining whether more graphics effects exist;
   selecting another graphics effect if more graphics effects exist;
   determining whether more objects exist; and
   selecting another object if more objects exist;
   wherein the shader program is generated based on processing of a file which is associated with a graphics effect.

44. A computer implemented method for determining whether a file is distributable, comprising:
   identifying a file stored in memory;
   determining whether the file is distributable; and
   indicating whether the file is distributable;
   wherein a shader program is capable of being generated based on processing of the file which is associated with a graphics effect;
   wherein the shader program is capable of being altered by tweaking the file.

45. A data structure stored in memory for identifying a shader program, comprising:
   a file including:
      a textual descriptive object for identifying a graphics effect associated with the file, and a plurality of shader code segments capable of executing the graphics effect in a plurality of operating environments;

wherein the shader code segments are organized in terms of the different operating environments;

wherein the shader program is capable of being altered by tweaking the file.

46. A method for generating a shader program using a graphical user interface, comprising:

displaying a plurality of graphics effects for allowing a user to select one graphics effect;

displaying the selected graphics effect as applied to an object using a file;

modifying the file based on user input;

processing the file; and generating a shader program based on the processing of the file;

wherein the shader program is capable of being altered by tweaking the file.

* * * * *

UNITED STATES PATENT AND TRADEMARK OFFICE
CERTIFICATE OF CORRECTION

| | | |
|---|---|---|
| PATENT NO. | : 7,009,605 B2 | |
| APPLICATION NO. | : 10/102989 | |
| DATED | : March 7, 2006 | |
| INVENTOR(S) | : Douglas Sim Dietrich, Jr., Ashutosh G. Rege and Christopher T. Maughan | |

It is certified that error appears in the above-identified patent and that said Letters Patent is hereby corrected as shown below:

On the Title Page, Item (75), Inventors, please delete "Jerome F. Duluk, Jr.";

Column 31, line 40, please replace "objects" with --object--.

Signed and Sealed this
Fifteenth Day of March, 2011

David J. Kappos
*Director of the United States Patent and Trademark Office*